(12) United States Patent
Tyler et al.

(10) Patent No.: US 10,403,869 B2
(45) Date of Patent: Sep. 3, 2019

(54) ADHESIVE TAPE FOR POSITIONING BATTERY CELLS IN A BATTERY MODULE

(71) Applicant: Johnson Controls Technology Company, Holland, MI (US)

(72) Inventors: Matthew R. Tyler, Brown Deer, WI (US); Jennifer L. Czarnecki, Franklin, WI (US)

(73) Assignee: CPS TECHNOLOGY HOLDINGS, LLC, New York, NY (US)

( * ) Notice: Subject to any disclaimer, the term of this patent is extended or adjusted under 35 U.S.C. 154(b) by 965 days.

(21) Appl. No.: 14/815,415

(22) Filed: Jul. 31, 2015

(65) Prior Publication Data

US 2016/0301045 A1    Oct. 13, 2016

Related U.S. Application Data

(60) Provisional application No. 62/146,763, filed on Apr. 13, 2015, provisional application No. 62/146,816, (Continued)

(51) Int. Cl.
*H01M 2/00* (2006.01)
*H01M 2/10* (2006.01)
(Continued)

(52) U.S. Cl.
CPC ......... *H01M 2/1077* (2013.01); *C09J 163/00* (2013.01); *H01M 2/0242* (2013.01);
(Continued)

(58) Field of Classification Search
CPC ............. H01M 2/0242; H01M 2/1027; H01M 10/058; H01M 10/647; H01M 2/1077;
(Continued)

(56) References Cited

U.S. PATENT DOCUMENTS 6,630,270 B1   10/2003   Kim et al.
7,862,919 B2    1/2011   Kim et al.
(Continued)

FOREIGN PATENT DOCUMENTS

CN       1292155    4/2001
CN     101401229    4/2009
(Continued)

OTHER PUBLICATIONS

Machine Translation of JP 2004111098 A by Tanjo Yuji et al. "Secondary Battery Module and Manufacturing Method" (Year: 2004).*

(Continued)

*Primary Examiner* — Milton I Cano
*Assistant Examiner* — Abibatu O Ojo-Amoo
(74) *Attorney, Agent, or Firm* — Fletcher Yoder, P.C.

(57) ABSTRACT

The present disclosure includes a battery module that includes a housing having a stack of battery cells. Each battery cell of the stack of battery cells includes a terminal end having at least one cell terminal and a face oriented transverse to the terminal end. The battery module also includes adhesive tape disposed between a first face of a first battery cell of the stack of battery cells and a second face of a second battery cell of the stack of battery cells, and where the adhesive tape fixedly couples the first battery cell to the second battery cell, and where a first terminal end of the first battery cell is substantially aligned with a second terminal end of the second battery cell.

18 Claims, 8 Drawing Sheets

Related U.S. Application Data filed on Apr. 13, 2015, provisional application No. 62/146,811, filed on Apr. 13, 2015.

(51) Int. Cl.

| | | |
|---|---|---|
| *H01M 2/02* | (2006.01) | |
| *H01M 2/30* | (2006.01) | |
| *H01M 10/0525* | (2010.01) | |
| *H01M 10/058* | (2010.01) | |
| *H01M 10/04* | (2006.01) | |
| *H01M 10/613* | (2014.01) | |
| *H01M 10/625* | (2014.01) | |
| *H01M 10/653* | (2014.01) | |
| *H01M 10/6554* | (2014.01) | |
| *C09J 163/00* | (2006.01) | |
| *H01M 2/16* | (2006.01) | |
| *H01M 2/20* | (2006.01) | |
| *H01M 10/6551* | (2014.01) | |
| *H01M 10/6555* | (2014.01) | |
| *H01M 10/647* | (2014.01) | |

(52) U.S. Cl.
CPC ....... *H01M 2/1027* (2013.01); *H01M 2/1094* (2013.01); *H01M 2/1653* (2013.01); *H01M 2/206* (2013.01); *H01M 2/305* (2013.01); *H01M 10/0413* (2013.01); *H01M 10/058* (2013.01); *H01M 10/0525* (2013.01); *H01M 10/613* (2015.04); *H01M 10/625* (2015.04); *H01M 10/653* (2015.04); *H01M 10/6551* (2015.04); *H01M 10/6554* (2015.04); *H01M 10/6555* (2015.04); *H01M 10/647* (2015.04); *H01M 2220/20* (2013.01)

(58) Field of Classification Search
CPC ............. H01M 2/1094; H01M 10/613; H01M 10/625; H01M 10/653; H01M 10/6555; C09J 163/00

USPC ........................................................ 429/157
See application file for complete search history.

(56) References Cited

U.S. PATENT DOCUMENTS

| | | | |
|---|---|---|---|
| 8,039,145 B2 | 10/2011 | Ha et al. | |
| 8,415,045 B2 | 4/2013 | Miyajima et al. | |
| 8,865,334 B2 | 10/2014 | Terada et al. | |
| 9,287,594 B2 | 3/2016 | Kimura | |
| 9,406,979 B2 | 8/2016 | Kwag et al. | |
| 2007/0224498 A1 | 9/2007 | Kim et al. | |
| 2012/0308873 A1* | 12/2012 | Sekino | H01M 2/1016 429/156 |
| 2013/0323575 A1 | 12/2013 | Tagawa et al. | |
| 2013/0337310 A1 | 12/2013 | Omura et al. | |
| 2014/0177141 A1 | 6/2014 | Cao | |

FOREIGN PATENT DOCUMENTS

| | | |
|---|---|---|
| CN | 101662037 | 3/2010 |
| CN | 102420297 | 4/2012 |
| CN | 103443958 | 12/2013 |
| CN | 103460439 | 12/2013 |
| CN | 103904281 | 7/2014 |
| CN | 205282518 U | 6/2016 |
| EP | 2058878 A1 | 5/2009 |
| EP | 2530763 | 12/2012 |
| JP | 2004111098 A * | 4/2004 |
| JP | 2015201373 | 11/2015 |
| KR | 20080042965 | 5/2008 |
| KR | 20140064418 | 5/2014 |

OTHER PUBLICATIONS

PCT/US2016/018442 Invitation to Pay Additional Fees dated Jun. 20, 2016.

\* cited by examiner

ADHESIVE TAPE FOR POSITIONING BATTERY CELLS IN A BATTERY MODULE

CROSS REFERENCE TO RELATED APPLICATIONS

This application claims priority from and the benefit of U.S. Provisional Application Ser. No. 62/146,763, filed Apr. 13, 2015, entitled "CELL TO CELL ADHESIVE TAPE," U.S. Provisional Application Ser. No. 62/146,816, filed Apr. 13, 2015, entitled "CELL TO HEAT SINK THERMAL EPOXY," and U.S. Provisional Application Ser. No. 62/146,811, filed Apr. 13, 2015, entitled "B-CARRIER TO CELL TO THERMAL EPOXY INTERFACE DESIGN FOR MANAGING CELL HEIGHT," which are hereby incorporated by reference in their entirety for all purposes. This application is related to U.S. Non-Provisional application Ser. No. 14/815,447, entitled "CELL TO HEAT SINK THERMAL ADHESIVE," filed on even date herewith, and U.S. Non-Provisional application Ser. No. 14/815,515, entitled "THERMAL EPOXY AND POSITIONING OF ELECTROCHEMICAL CELLS," filed on even date herewith, both of which are incorporated herein by reference in their entirety for all purposes.

BACKGROUND

The present disclosure relates generally to the field of batteries and battery modules. More specifically, the present disclosure relates to an adhesive tape for positioning electrochemical cells in a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrochemical cells having slightly different heights relative to each other due to manufacturing imperfections (e.g., engineering tolerances). Unfortunately, the electrochemical cells having slightly different heights may complicate electrical coupling of the electrochemical cells and assembly of the battery module in general. Additionally, battery cells may produce thermal energy (e.g., heat) in various situations, which may damage sensitive components (e.g., other battery cells) in the battery module. Therefore, it is now recognized that improved positioning of electrochemical cells in a battery module as well as thermal energy transfer to a heat sink is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module having a stack of battery cells disposed in a battery module housing. Each battery cell of the stack of battery cells may include a terminal end having at least one cell terminal and a face oriented transverse to the terminal end. An adhesive tape may be disposed between a first face of a first battery cell of the stack of battery cells and a second face of a second battery cell of the stack of battery cells, and the adhesive tape fixedly couples the first battery cell to the second battery cell. A first terminal end of the first battery cell is aligned with a second terminal end of the second battery cell.

The present disclosure also relates to a battery module having a housing with a base surface and a stack of battery cells disposed in the housing, where each battery cell of the stack of battery cells has a terminal end, a base end, and a face. The terminal end of each battery cell of the stack of battery cells is substantially aligned by a process that includes depositing a film of thermal epoxy on a base surface of a battery module housing, aligning a first terminal end of the first battery cell and a second terminal end of the second battery cell within substantially the same plane, disposing adhesive tape between a first battery cell of the stack of battery cells and a second battery cell of the stack of battery cells such that the first battery cell and the second battery cell are fixedly coupled to one another, and disposing the first battery cell and the second battery cell into the housing such that the film of thermal epoxy is positioned between the base ends of the first battery cell and the second battery cell and the base surface of the housing.

The present disclosure also relates to a method of manufacturing a battery module that includes arranging first and second battery cells in a co-planar arrangement by aligning a first terminal end of the first battery cell with a second terminal end of the second battery cell; disposing a double-sided adhesive sheet between a first battery cell and a second battery cell such that the first battery cell and the second battery cell are fixedly coupled to one another; and positioning the first battery cell and the second battery cell together as a single unit in a battery module housing.

DRAWINGS

Various aspects of this disclosure may be better understood upon reading the following detailed description and upon reference to the drawings in which.

Figure 2:
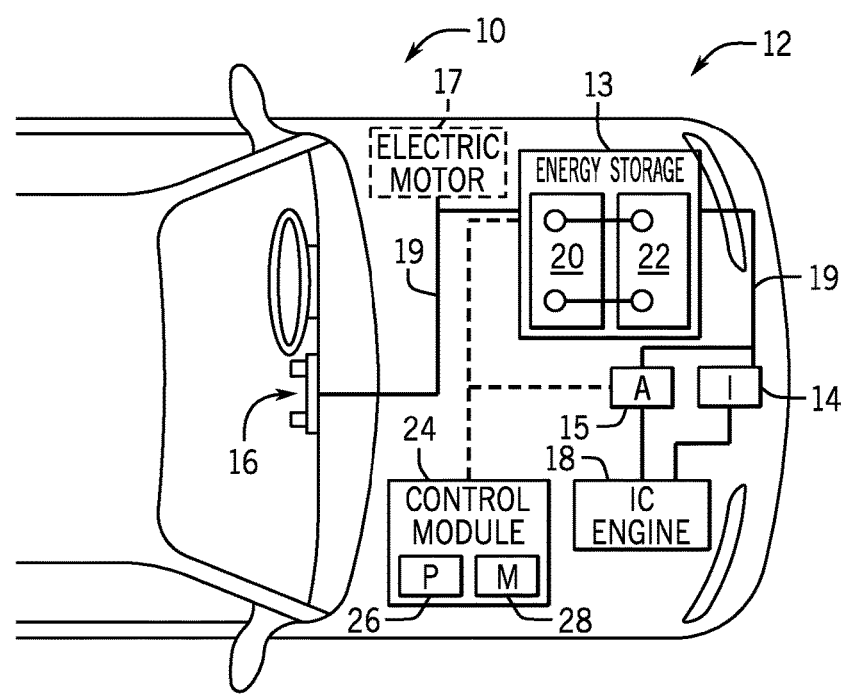
FIG. 2 is a cutaway schematic view of an embodiment of the vehicle and the battery system of FIG. 1, in accordance with an aspect of the present disclosure.
Figure 3:
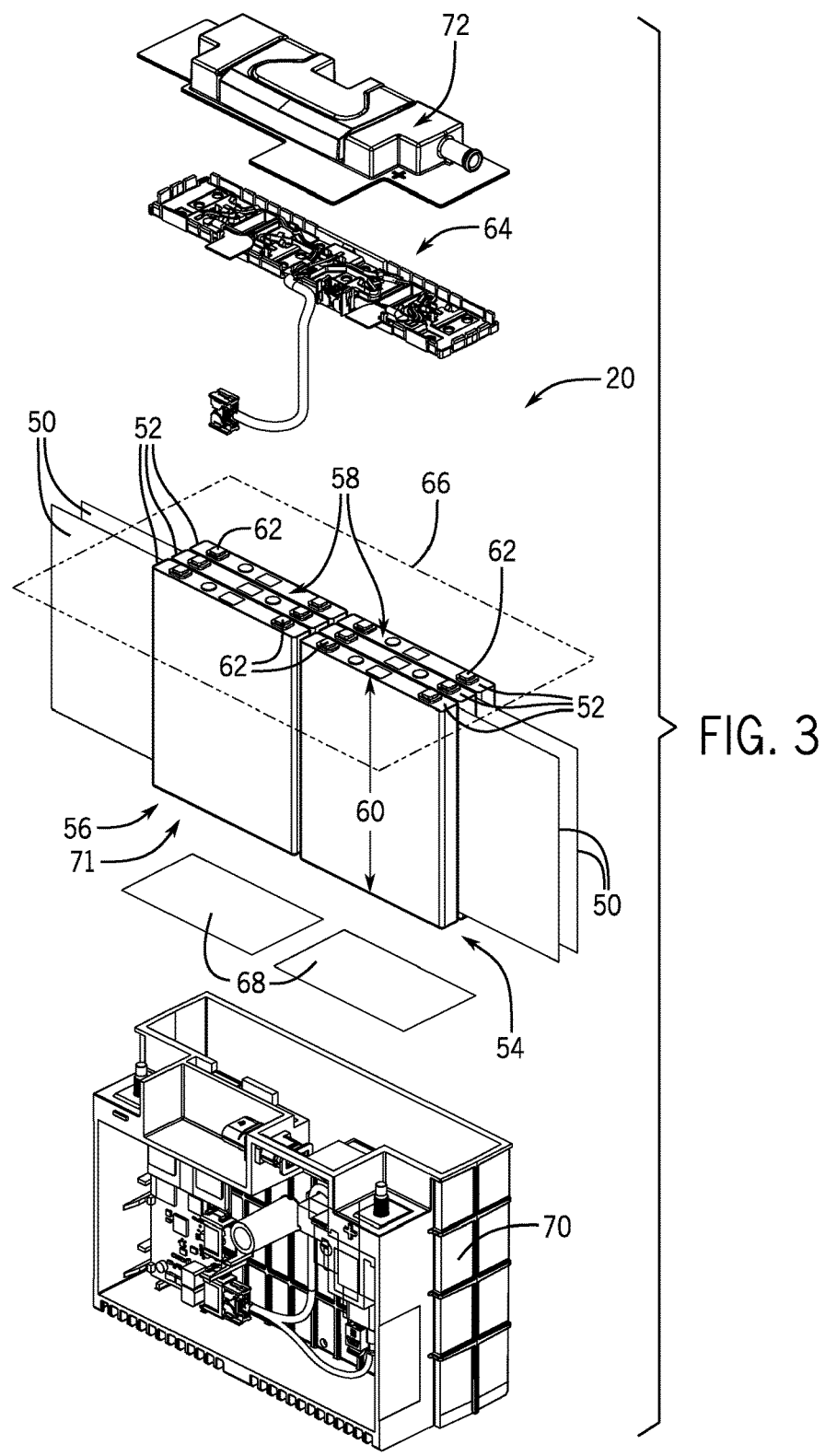
FIG. 3 is an exploded view of an embodiment of the battery module of FIG. 2 that includes double-sided adhesive sheets between individual battery cells of battery cell stacks, in accordance with an aspect of the present disclosure.
Figure 6:
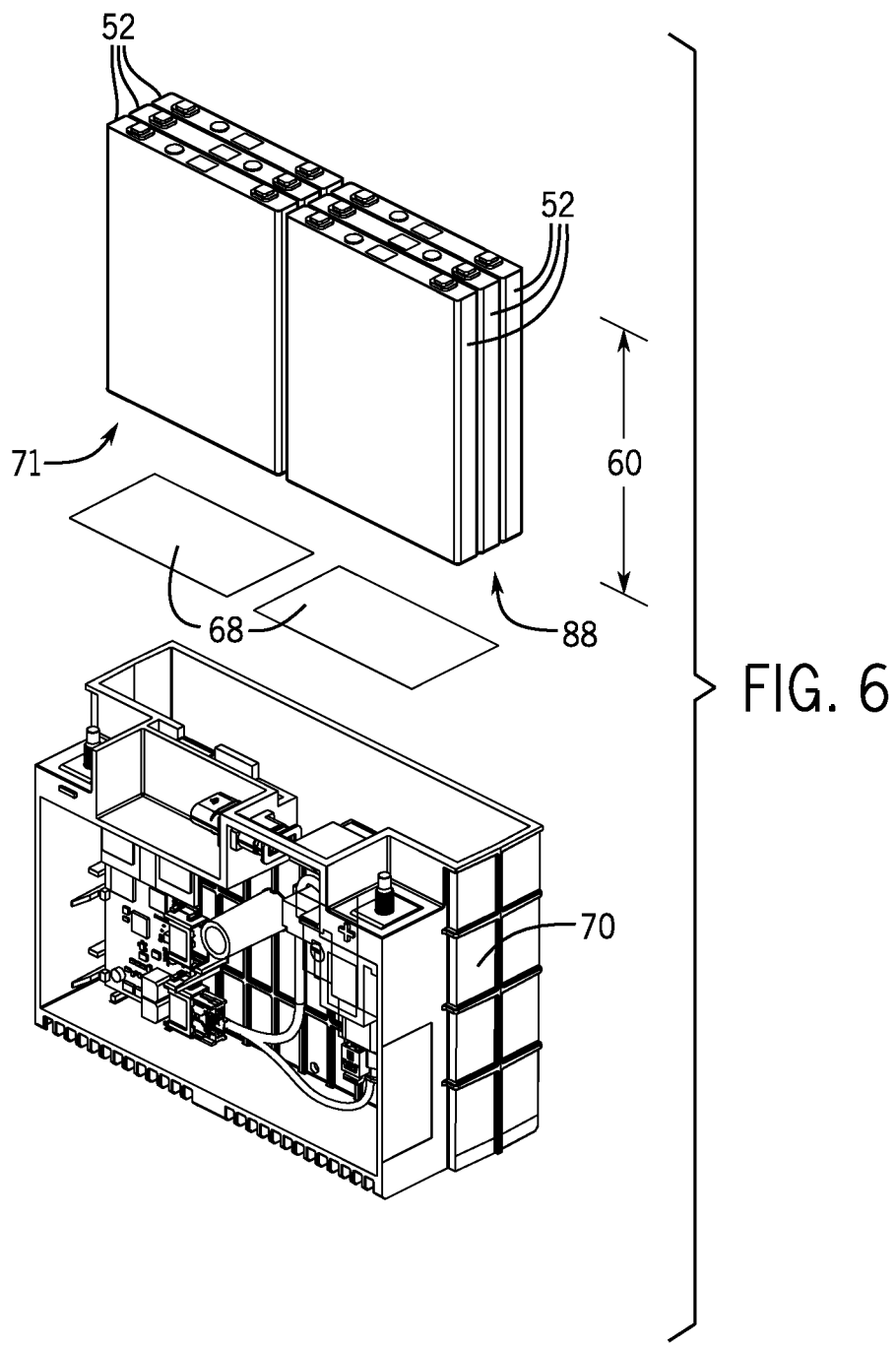
FIG. 6 is an exploded perspective view of the battery module of FIG. 2 having a thermal epoxy layer, in accordance with an aspect of the present disclosure.
Figure 8:
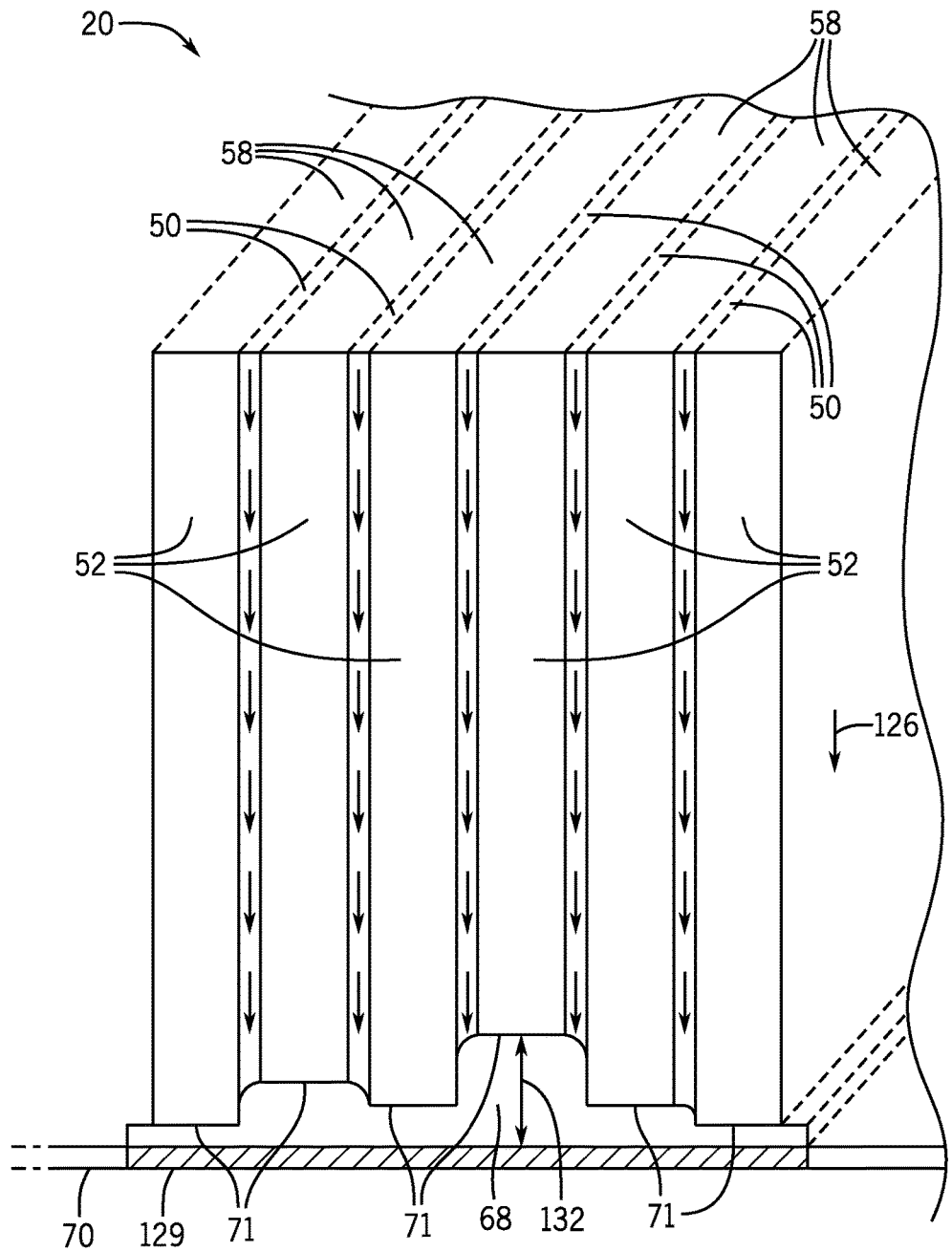
Figure 9:
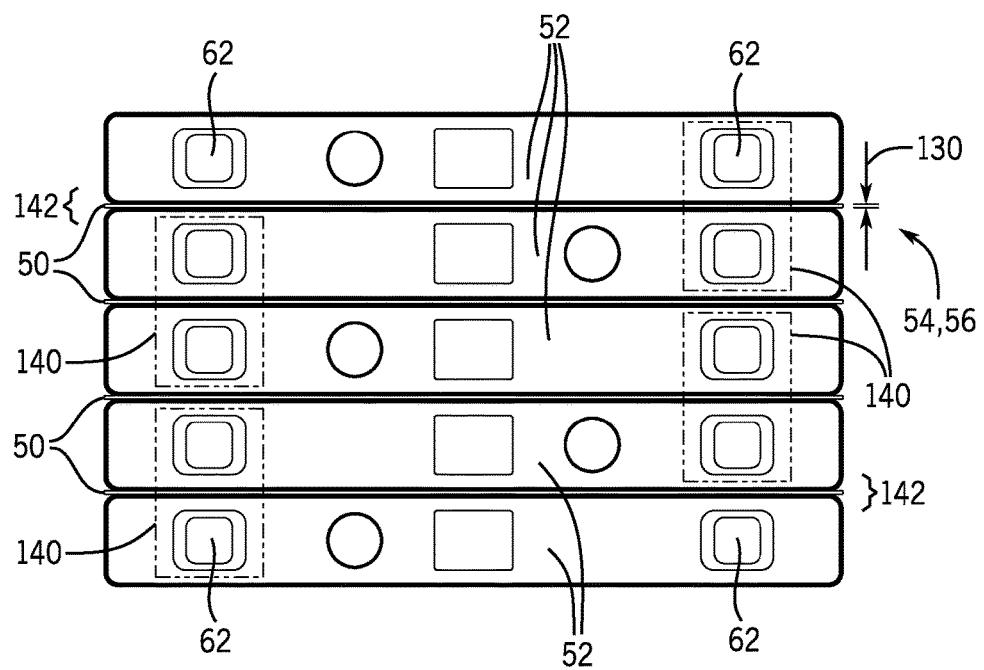

FIG. 8 is a perspective view of the battery module of FIG. 2 having the double-sided adhesive sheets of FIG. 3 that direct thermal energy toward the thermal epoxy layer of FIG. 6, in accordance with an aspect of the present disclosure; and FIG. 9 is a plan view of the battery cell stack of FIG. 3 having the double-sided adhesive sheets of FIG. 3 disposed between battery cells, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing and battery cells (e.g., electrochemical cells) disposed within the housing. For example, the housing may include a cell receptacle region (e.g., opening) configured to receive the electrochemical cells. The battery module may include a cover disposed over the cell receptacle region after the battery cells are disposed within the housing, and a lid (e.g., bus bar carrier) disposed between the cover and the battery cells. For example, the lid (e.g., bus bar carrier) may include bus bars and other electrical components disposed thereon, where the bus bars are configured to interface with terminals of the battery cells to electrically connect the battery cells. It is now recognized that, in such an arrangement, it may be desirable for terminal ends (e.g., cell terminals) of the battery cells to be substantially aligned to facilitate an electrical connection between the lid and the battery cells.

However, due to manufacturing imperfections (e.g., engineering tolerances), at least some of the battery cells may include a different height than other battery cells. In accordance with present embodiments, the battery cells may be aligned with one another in one or more stacks of battery cells. The battery cells may be positioned in the stack(s) such that the terminal ends of the battery cells are substantially aligned with one another in a single plane. For example, double-sided adhesive sheets (e.g., adhesive tape) may be utilized between individual battery cells to adhesively couple the battery cells (e.g., fixedly couple such that the battery cells do not move) in a desired arrangement (e.g., a co-planar arrangement where terminal ends of each battery cell in a stack are substantially aligned in the same plane). Therefore, the double-sided adhesive sheet (e.g., adhesive tape) may be used to align the terminal ends of the battery cells within a single plane, even when the cells are a different height.

Moreover, the double-sided adhesive sheets (e.g., adhesive tape) may be configured to direct thermal energy produced by an individual battery cell to protect other components of the battery module (e.g., other battery cells), thereby enhancing the lifetime of the battery module. For example, the double-sided adhesive sheets (e.g., adhesive tape) may thermally insulate the individual battery cells from one another (e.g., block transfer of thermal energy between a first battery cell and a second battery cell). The double-sided adhesive sheets (e.g., adhesive tape) may also be configured to direct thermal energy produced by a battery cell toward a heat sink or other heat exchanger configured to direct the thermal energy out of the battery module. In some embodiments, the double-sided adhesive sheets (e.g., adhesive tape) may have anisotropic thermal conductivity and are configured to anisotropically conduct thermal energy (e.g., conduct thermal energy along a certain directions but not others).

In some embodiments, the heat sink may be thermal epoxy (e.g., compliant thermal epoxy) disposed along base ends of the battery cells opposite to the terminal ends of the electrochemical cells. The thermal epoxy may be disposed (e.g., sandwiched) between the base ends of the battery cells and a base surface or wall of the housing such that the thermal energy from the double-sided adhesive sheets (e.g., adhesive tape) may be directed toward the thermal epoxy. In some embodiments, the battery module may include a heat sink plate or other device incorporated in the housing that may be configured to transfer thermal energy outside of the battery module (e.g., to a surrounding environment). For example, the thermal epoxy may conduct (e.g., transfer) the thermal energy from the battery cells toward the heat sink plate or other device, thereby enabling the thermal energy to be exhausted outside of the battery module. Additionally, because the electrochemical cells are aligned with one another across their terminal ends, the base ends of the electrochemical cells may not be substantially aligned in a single plane. Accordingly, the thermal epoxy may be compliant, such that the thermal epoxy conforms with the base ends of the electrochemical cells to compensate for differences in height.

Figure 1:
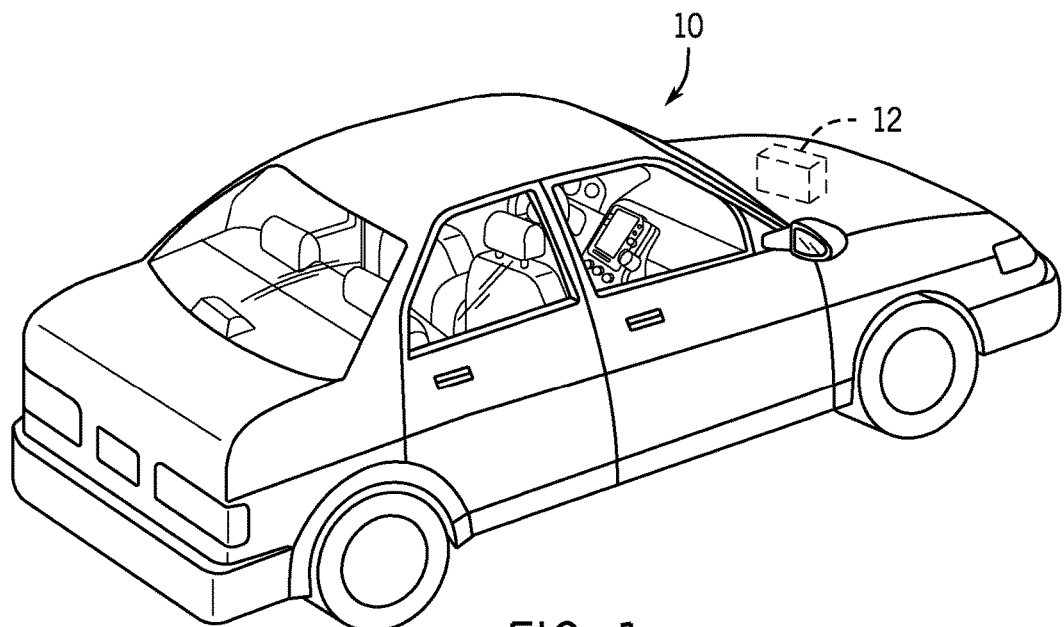
FIG. 1 is a perspective view of a vehicle having a battery system configured in accordance with present embodiments to provide power for various components of the vehicle, in accordance with an aspect of the present disclosure.

To help illustrate the manner in which the present embodiments may be used in a system, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

As discussed above, some individual battery cells of the battery module 20 may have a height different from other individual battery cells of the battery module 20. These differences in height between the battery cells of the battery module 20 may be undesirable when establishing an electrical connection between the battery cells using a lid (e.g., bus bar carrier). For example, when terminal ends of battery cells are not substantially aligned in a single plane, varying forces may be applied between the lid (e.g., bus bar carrier) and terminals of the battery cells, which may result in a weak electrical connection between certain battery cells. Additionally, exerting a large force on a battery cell terminal may cause damage to the battery cell terminal over time and decrease a life of the battery module. It may be also desirable to include thermally conductive and/or thermally insulative layers (e.g., materials) in the double-sided adhesive sheets to both thermally insulate battery cells from one another and to direct thermal energy produced from one of the battery cells to a heat sink or other heat exchanger. Therefore, it is now recognized that, as shown in FIG. 3, aligning the terminal ends (e.g., top ends) of the battery cells using double-sided adhesive sheets may be desirable. For example, FIG. 3 is an exploded perspective view of the battery module 20 that includes double-sided adhesive sheets 50 between individual battery cells 52 of a first battery cell stack 54 and a second battery cell stack 56. The first battery cell stack 54 may be positioned into the battery module 20 as a single unit (e.g., as an adhesively secured assembly).

As discussed above, the double-sided adhesive sheets 50 may be utilized to align terminal ends 58 of the battery cells 52 to ensure a robust connection even when the battery cells 52 include different heights 60. As shown in the illustrated embodiment of FIG. 3, each individual battery cell 52 may include one or more terminals 62 that are configured to transfer electrical energy produced by the battery cell 52. Additionally, the battery module 20 may include a lid 64 (e.g., a bus bar carrier). In certain embodiments, the lid 64 may be configured to facilitate an electrical connection between the individual battery cells 52 and/or between the battery cells 52 and an external load (e.g., the xEV 10). The double-sided adhesive sheets 50 may be positioned between the battery cells 52 to adhesively couple the battery cells 52 of the battery cell stack 54, 56 to one another such that the terminal ends 58 lie along (e.g., generally in alignment with) a single plane 66. Accordingly, the force between each battery cell 52 and the lid 64 may be substantially equal and an electrical and a mechanical connection may be established between each battery cell 52. This may ensure that a robust weld may be formed between each terminal 62 of the battery cells 52 and components (e.g., bus bars) of the lid 64.

The battery module 20 may also include thermal epoxy 68. For example, a thermal epoxy layer 68 may be deposited on a base surface of a cell receptacle region 69 of a housing 70 of the battery module 20. In the illustrated embodiment of FIG. 3, the battery module 20 includes two thermal epoxy layers 68, one for each battery cell stack 54 and 56. Accordingly, the thermal epoxy layers 68 may be positioned between the battery cells 52 and the base surface of the housing 70 when the battery cells 52 are disposed in the housing 70 (e.g., via an opening or receptacle in the housing 70). In some embodiments, the thermal epoxy layer 68 is configured to fill (e.g., expand or flow into) any gaps formed on base ends 71 of the battery cells 52, which may result from the differences in heights 60 of the battery cells 52 and the alignment of the terminal ends 58 of the battery cells 52 in the plane 66.

The illustrated embodiment of FIG. 3 also illustrates the battery module 20 having a cover 72 for the housing 70. As such, when the thermal epoxy layer 68, the battery cells 52, and/or the lid 64 are positioned within the housing 70, the cover 72 may be disposed on the housing 70 to enclose the battery module 20 and form a single, integrated unit that may provide power to a load (e.g., the xEV 10).

Figure 4:
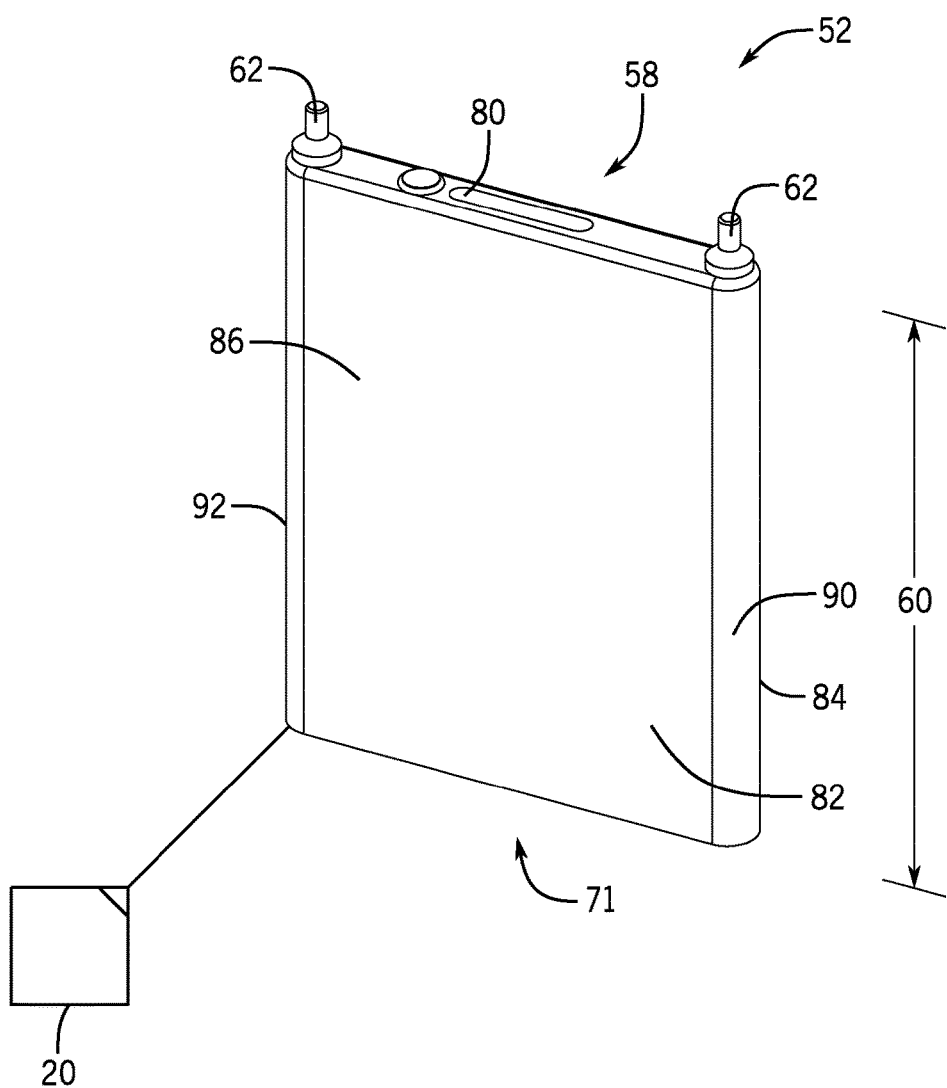
FIG. 4 is a perspective view of an embodiment of one of the battery cells of the battery module of FIG. 2, in accordance with an aspect of the present disclosure.

To facilitate discussion of the present embodiments, FIG. 4 illustrates an embodiment of one of the battery cells 52 of the battery module 20. In a prismatic cell configuration, as shown in FIG. 4, the battery cells 52 include the terminal end 58 having at least one terminal 62 (the illustrated embodiment has two cell terminals 62 on the terminal end 58) and a cell vent 80 configured to enable pressurized gas to escape during a venting situation (e.g., when a pressure in the battery cell 52 reaches or exceeds a threshold value). The illustrated battery cell 52 of FIG. 4 also includes a first face 82 and a second face 84, corresponding to the broadest part of a casing 86 of the battery cell 52. The base end 71 is substantially opposite the terminal end 58, and may, in some embodiments, include the cell vent 80 in lieu of the cell vent 80 on the terminal end 58. The faces 82 and 84 extend between the top 58 and base ends 71, and are coupled by a first side 90 and a second side 92. The first side 90 and the second side 92 may be straight, rounded, or any other suitable geometry. The casing 86 (e.g., can or housing) of the battery cell 52, which houses the active electrochemical elements of the battery cell 52, may be polymeric, metallic, composite, or any other suitable material. Further, it should be noted that the present embodiments are not limited to battery modules 20 having prismatic battery cell configurations, but are also intended to include embodiments where the battery cells 52 are pouch battery cells, cylindrical battery cells, and so forth.

Figure 5:
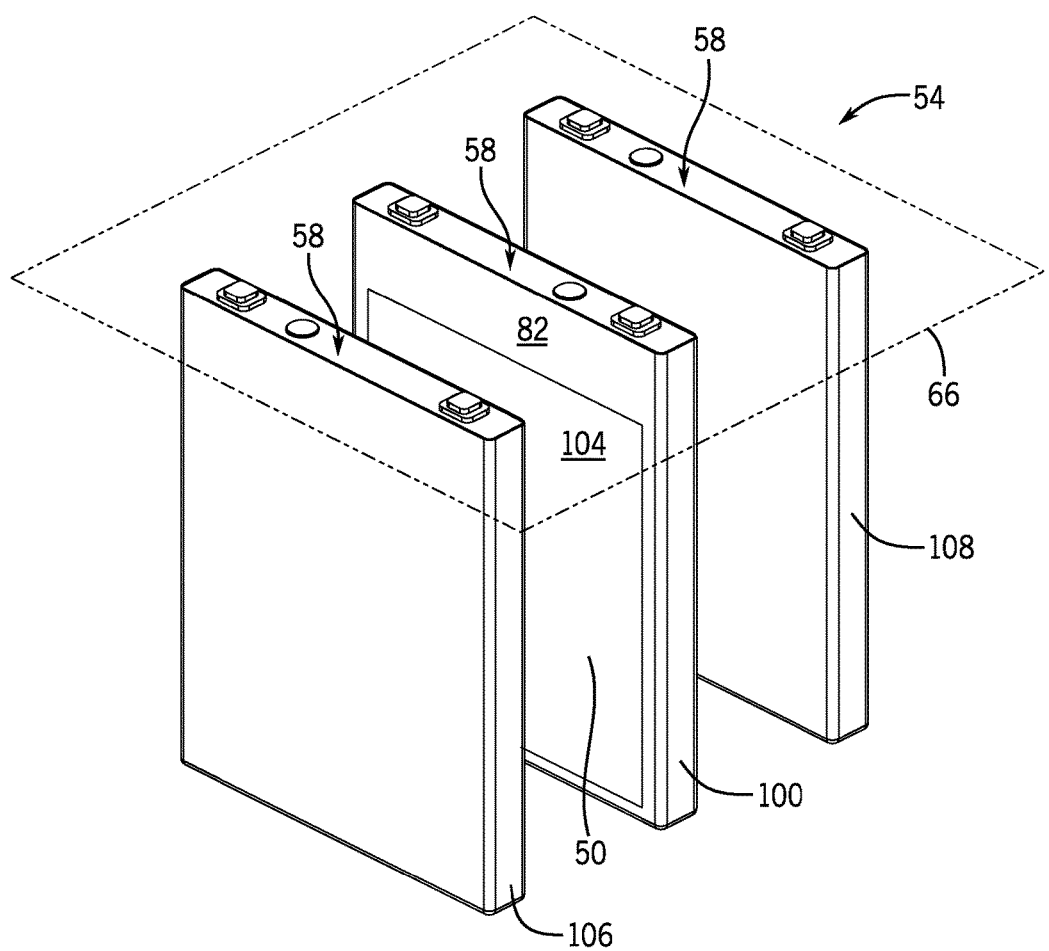
FIG. 5 is an exploded view of a battery cell stack of FIG. 3 having a double-sided adhesive sheet disposed on a center battery cell of the stack, in accordance with an aspect of the present disclosure.

However, as discussed above, the height 60 of one battery cell 52 may be different from another battery cell 52. Therefore, the double-sided adhesive sheets 50 may be utilized to adhesively couple the battery cells 52 to one another so that the terminal ends 58 of the battery cells 52 are substantially aligned within the plane 66. This may be achieved by, for example, placing the terminal ends 58 (e.g., top ends) of the battery cells 52 on a substantially flat surface such that their terminals are aligned within the plane 66, followed by securing the battery cells 52 (e.g., of a stack 54, 56) to one another using the double-sided adhesive sheet 50. FIG. 5 illustrates an exploded view of the first battery cell stack 54 having one of the double-sided adhesive sheets 50 disposed on the first face 82 of a center battery cell 100 of the stack 54. In certain embodiments, the double-sided adhesive sheet 50 may include a first surface 102 (e.g., see FIG. 7) and a second surface 104. As shown in the illustrated embodiment of FIG. 5, the first surface 102 is attached to the first face 82 of the center battery cell 100, and the second surface 104 is facing a first outer battery cell 106. Therefore, the second surface 104 may be configured to couple to the second face 84 of the first outer battery cell 106 such that the center battery cell 100 and the first outer battery cell 106 are adhesively coupled (e.g., attached or glued together such that the battery cells 100, 106 do not move).

In certain embodiments, the double-sided adhesive sheet 50 may include a support layer (e.g., thermally insulative layer) that includes a material such as polyvinyl chloride (PVC), polyethylene terephthalate (PET), or a combination thereof. Moreover, the double-sided adhesive sheets 50 may include an adhesive material on the first surface 102 (e.g., of the support layer) and/or the second surface 104 (e.g. of the support layer) that enables the double-sided adhesive sheet 50 to adhere to the first face 82 of the center battery cell 100 and/or the second face 84 of the first outer battery cell 106. In certain embodiments, the adhesive material may be an acrylic adhesive, a rubber adhesive, or any combination thereof. In other embodiments, the double-sided adhesive sheet 50 may not include a support layer, and thus, may include an unsupported adhesive material.

Additionally, the first battery cell stack 54 may include a second of the double-sided adhesive sheets 50 positioned between the center battery cell 100 and a second outer battery cell 108. The additional double-sided adhesive sheet 50 may be configured to adhesively couple (e.g., attach or glue together) the center battery cell 100 and the second outer battery cell 108. For example, the first surface 102 of the additional double-sided adhesive sheet 50 may couple to the second side 84 of the center battery cell 100 and the second surface 104 of the additional double-sided adhesive sheet 50 may couple to the first side 82 of the second outer battery cell 108 via the adhesive (e.g., acrylic adhesive or rubber adhesive). Accordingly, the double-sided adhesive sheets 50 may be configured to provide an adhesion force between the center battery cell 100 and the first and/or second outer battery cells 106, 108 of between 0.01 Newtons per square millimeter ($N/mm^2$) and 0.1 $N/mm^2$.

In certain embodiments, the double-sided adhesive sheets 50 may be configured to wrap around a side 90, 92 of the battery cells 52 (e.g., the center battery cell 100) such that a single double-sided adhesive sheet 50 may be configured to cover both the first face 82 of the center battery cell 100 and the second face 84 of the center battery cell 100. Accordingly, the single double-sided adhesive sheet 50 may couple both the first outer battery cell 106 and the second outer battery cell 108 to the center battery cell 100. In certain embodiments, the double-sided adhesive sheet 50 may not contain adhesive in regions corresponding to the first and second sides 90, 92 of the battery cell 52. In still further embodiments, the double-sided adhesive sheets 50 may be configured to extend between battery cells 52 of the first and second battery cell stacks 54, 56. Accordingly, the double-sided adhesive sheets may align battery cells within each stack 54, 56, as well as align the terminal ends 58 of the battery cells 52 between stacks 54, 56 (e.g., align the battery cells 52 of the first battery cell stack 54 with the battery cells 52 of the second battery cell stack 56 in the plane 66).

In certain embodiments, when the first outer battery cell 106, the center battery cell 100, and the second outer battery cell 108 are adhesively coupled to one another (e.g., attached or glued together such that the battery cells 100, 106, 108 do not move with respect to one another), the terminal ends 58 of the battery cells 100, 106, and 108 may be substantially aligned within the plane 66. Therefore, the amount of force between the terminals 62 of the battery cells 100, 106, and 108 and the lid 64 may be substantially equal, thereby ensuring a suitable electrical connection between the battery cells 100, 106, and 108.

In some cases, aligning the terminal ends 58 of the battery cells 52 (e.g., battery cells 100, 106, and 108) may cause the base ends 71 of the battery cells 52 to be misaligned. FIG. 6 illustrates an exploded perspective view of the battery module 20 having the thermal epoxy layers 68, which may be configured to account for such misalignment. The thermal epoxy layers 68 may be positioned between the base ends 71 of each of the battery cells 52 and a base surface of the housing 70.

In certain embodiments, the thermal epoxy layers 68 may be compliant, thereby enabling the base ends 71 of each of the battery cells 52 to contact the thermal epoxy layer 68 and account for the varying heights 60 of the battery cells 52. For example, one of the battery cells 52 having a larger height 60 may compress the thermal epoxy layer 68 further toward the base surface of the housing 70, whereas one of the battery cells 52 having a smaller height 60 may contact the thermal epoxy layer 68, but not substantially compress the thermal epoxy layer 68. In certain embodiments, the battery cells 52 may be adhesively coupled to the housing 70 when the base ends 71 contact the thermal epoxy layer 68 because the thermal epoxy layer 68 may have adhesive properties. In such embodiments, the thermal epoxy layer 68 may prevent substantial movement of the battery cells 52 resulting from vibrations and/or other disturbances that the battery module 20 may experience (e.g., when driving the xEV 10).

Figure 7:
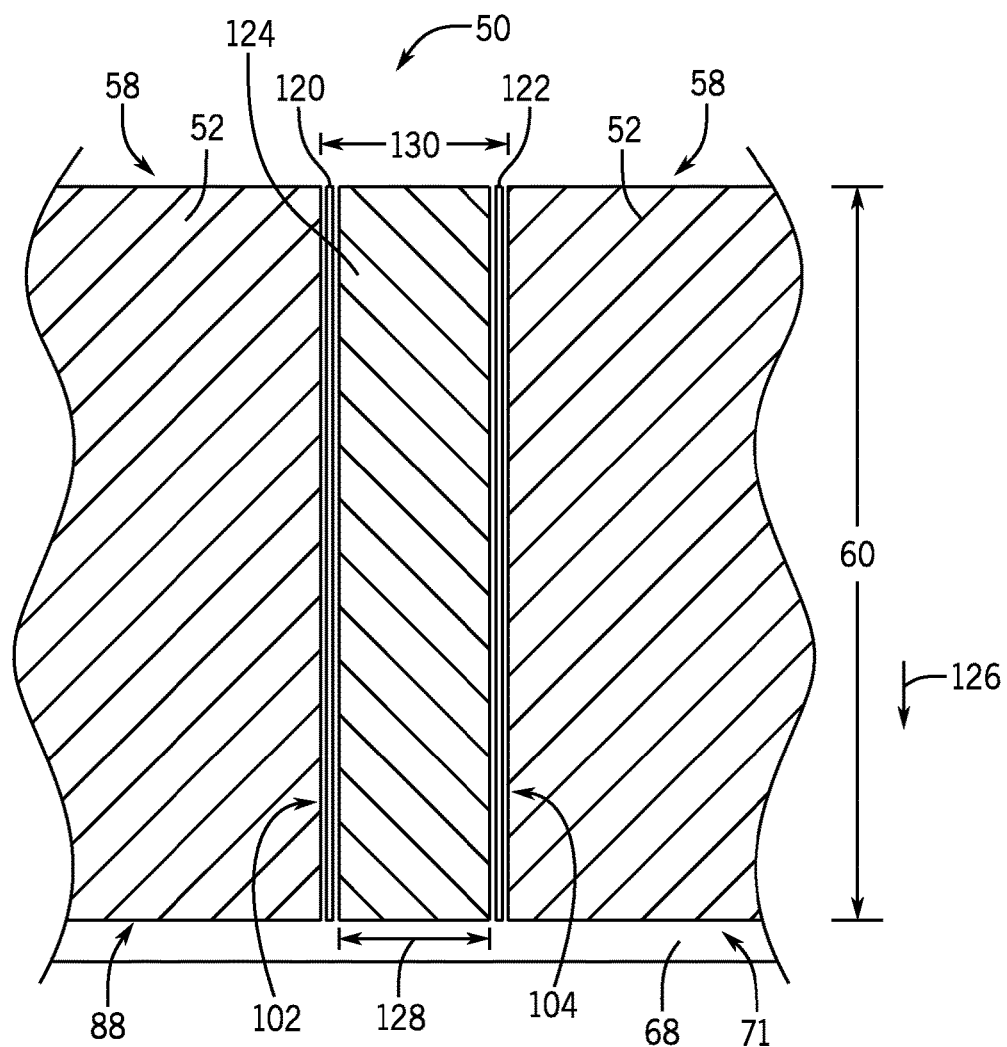
FIG. 7 is a cross-sectional view of an embodiment of the double-sided adhesive sheet of FIG. 3, in accordance with an aspect of the present disclosure.

As discussed above, the thermal epoxy layer(s) 68 may also be utilized in combination with the double-sided adhesive sheet 50 to direct thermal energy outside of the battery module 20 to protect various components disposed in the housing 70 of the battery module 20. For example, FIG. 7 illustrates a cross-sectional view of an embodiment of the double-sided adhesive sheet 50. In the illustrated embodiment, the double-sided adhesive sheet 50 is disposed between two battery cells 52. Additionally, the double-sided adhesive sheet 50 is illustrated as having a first thermally conductive layer 120 (e.g., a first adhesive layer), a second thermally conductive layer 122 (e.g., a second adhesive layer), and a thermally insulative layer 124 (e.g., the support layer).

The first thermally conductive layer 120 may include the first surface 102 of the double-sided adhesive sheet 50, and thus, may include the adhesive (e.g., acrylic adhesive or rubber adhesive). Additionally, the second thermally conductive layer 122 may include the second surface 104, which may also include the adhesive (e.g., acrylic adhesive or rubber adhesive). In certain embodiments, the adhesive included in the first thermally conductive layer 120 and the second thermally conductive layer 122 may have thermally conductive properties and be configured to direct thermal energy produced from the battery cells 52 in a direction 126 toward the thermal epoxy layer 68. For example, the double-sided adhesive sheet 50 may include any commercially available transfer tape having the desired adhesive properties noted herein, and may include certain conductive features (e.g., graphene structures, carbon and/or metallic nanotubes, conductive particles) that enable the double-sided adhesive sheet 50 to conduct thermal energy primarily along the longitudinal axis of the double-sided adhesive sheet 50 (e.g., along the plane of the double-sided adhesive sheet 50). As one non-limiting example, the double-sided adhesive sheet 50 may include one or more conductive fillers disposed in alignment with one another along the plane of the double-sided adhesive sheet 50, while being spaced apart in a thickness direction of the double-sided adhesive sheet 50 to enable electrical insulation and to suppress thermal conductivity in the thickness direction. Such adhesive sheets may be referred to as anisotropic adhesives, anisotropic films, or anisotropic conductive films. Additionally, the thermally insulative layer 124 (e.g., the support layer) may be positioned between the first thermally conductive layer 120 and the second thermally conductive layer 122 such that thermal energy may not be transferred from one battery cell 52 to another battery cell 52. Accordingly, the double-sided adhesive sheet 50 may act to thermally insulate the battery cells 52 from one another. Additionally, the double-sided adhesive sheet 50 may be configured to electrically insulate the battery cells 52 from one another. In certain embodiments, a battery cell 52 may incur an overcharge, which may cause the battery cell 52 to increase in temperature, and thus to release thermal energy. The thermally insulative layer 124 (e.g., the support layer) of the double-sided adhesive sheet 50 may resist a transfer of thermal energy between battery cells 52, thereby preventing a first battery cell adjacent to a second battery cell in thermal runaway from incurring an excessive increase in temperature (e.g., an increase in temperature beyond a normal operating temperature). Therefore, the double-sided adhesive sheet 50 may prevent the first battery cell from also incurring thermal runaway (e.g., thermal propagation prevention).

Accordingly, the thermally insulative layer 124 (e.g., the support layer) may include a non-thermally conductive material (e.g., PVC or PET) that blocks the transfer of thermal energy from the first thermally conductive layer 120 to the second thermally conductive layer 122, and thus blocks transfer of thermal energy between battery cells 52. The thermally insulative layer 124 (e.g., the support layer) may include a thickness 128 suitable to block a substantial amount of thermal energy produced by the battery cells 52. Therefore, the thickness 128 of the thermally insulative layer 124 may be large enough to block the transfer of most thermal energy between the battery cells 52, but not so large that a size of the stacks 54, 56 and/or the battery module 20 would be significantly increased.

As shown in the illustrated embodiment of FIG. 7, the double-sided adhesive sheet 50 may span the height 60 of the battery cells 52 (e.g., extend from the base ends 71 to the terminal ends 58 of the battery cells 52). Accordingly, the double-sided adhesive sheet 50 may include an area (e.g., height and width) that is substantially equal to an area of the faces 82, 84 of the battery cells 52. In other embodiments, the double-sided adhesive sheet 50 (e.g., the first thermally conductive layer 120, the second thermally conductive layer 122, and/or the thermally insulative layer 124) may include a height shorter than the height 60 of the battery cells 52. However, it should be noted that the double-sided adhesive sheet 50 may have an area (e.g., height and width) suitable to adhesively couple (e.g., attach or glue together) the battery cells 52 to one another, and thus, substantially align the terminal ends 58. Additionally, the double-sided adhesive sheet 50 may include a total thickness 130 configured to fit between a gap formed between battery cells 52 when coupling the battery cells 52 to bus bars, for example. In certain embodiments, the bus bars may cause the battery cells 52 to be positioned a predetermined distance from one another such that a gap is formed between the battery cells 52. Accordingly, the total thickness 130 of the double-sided adhesive sheets 50 may be substantially equal to a width of the gap. In other embodiments, the total thickness 130 of the double-sided adhesive sheets 50 may be determined as a percentage of a thickness of the battery cells 52. For example, the total thickness 130 of the double-sided adhesive sheets 50 may be between 1% and 10% of a thickness of the battery cells 52.

It should be noted that while the double-sided adhesive sheet 50 illustrated in FIG. 7 includes three layers, the double-sided adhesive sheet 50 may include any suitable number of layers such that the double-sided adhesive sheet 50 may adhesively couple (e.g., attach or glue together) the battery cells 52 in a co-planar arrangement (e.g., substantially align the terminal ends 58 of each battery cell 52 in a single plane), thermally insulate the battery cells 52 from one another, and/or direct thermal energy toward the thermal epoxy layer 68 (e.g., anisotropically conduct thermal energy toward the thermal epoxy layer 68). For example, in certain embodiments, the double-sided adhesive sheet 50 may include a single layer that has a material with an anisotropic thermal conductivity (e.g., a film, a paste, and/or an adhesive having anisotropic properties) that is configured to conduct thermal energy primarily in a direction toward the thermal epoxy layer 68 (e.g., the direction 126). In still further embodiments, the double-sided adhesive sheet 50 may include a single layer that has an isotropic thermal conductivity, which may enable some transfer of thermal energy between battery cells 52.

In certain embodiments, the double-sided adhesive sheets 50 may include fillers to enhance a thermal conductivity of the double-sided adhesive sheets 50 and/or to enhance thermal insulative properties of the double-sided adhesive sheets 50. For example, the adhesive of the double-sided adhesive sheets 50 may be doped with thermally conductive particles (e.g., a metal), carbon black, thermally conductive nanotubes, or a combination thereof, which may enhance the thermal conductivity of the double-sided adhesive sheets 50 (e.g., via the adhesive).

When thermal energy (e.g., an increase in temperature) is produced by a battery cell 52, it may be desirable to direct such energy outside of the battery module 20 to protect sensitive components in the battery module 20 from exposure to the thermal energy. FIG. 8 is a perspective view of the battery module 20 schematically illustrating the double-sided adhesive sheets 50 directing thermal energy toward the thermal epoxy layer 68. As shown in the illustrated embodiment of FIG. 8, the double-sided adhesive sheets 50 (e.g., via the first and second thermally conductive layers 120, 122) may direct thermal energy toward the thermal epoxy layer 68 in the direction 126. Further, transfer of the thermal energy may be limited to the direction 126 such that thermal energy produced by one battery cell 52 is not transferred to another battery cell 52.

The thermal epoxy layer 68 may include thermally conductive properties such that the thermal epoxy layer 68 is configured to direct the thermal energy toward a heat exchanger or a heat sink 129 in the battery module 20. The heat exchanger and/or heat sink 129 may be configured to disperse the thermal energy (e.g., to a surrounding medium or material) or otherwise direct the thermal energy outside of the battery module 20 (e.g., via a vent or another outlet). Accordingly, sensitive components (e.g., electronics and other battery cells 52) may be protected from exposure to increased temperatures that may result from the thermal energy, and the lifetime of the battery module 20 may be enhanced.

Additionally, FIG. 8 illustrates how the thermal epoxy layer 68 may account for the differences in the heights 60 of the battery cells 52. For example, the terminal ends 58 (e.g., the terminals 62) of the battery cells 52 are substantially aligned in the plane 66. However, as shown in the illustrated embodiment of FIG. 8, the base ends 71 of the battery cells 52 may not be aligned because some of the battery cells 52 include a shorter height 60 than other battery cells 52. Accordingly, the thermal epoxy layer 68 may include compliant properties that account for such differences in height 60 and fill any gaps formed between the base ends 71 of the battery cells 52 and the base surface of the housing 70. Additionally, as discussed above, the thermal epoxy layer 68 may adhere to the base ends 71 of the battery cells as well as the base surface of the housing 70 such that the battery cells 52 may be secured in the housing 70, which may avoid any damage caused by vibrations and/or other movement of the battery module 20.

FIG. 9 illustrates a top view of the battery cell stack 54, 56 having double-sided adhesive sheets 50 disposed between battery cells 52. The total thickness 130 of the double-sided adhesive sheets 50 may be exaggerated to show the position of the double-sided adhesive sheets 50. As shown in the illustrated embodiment of FIG. 9, the battery cells 52 of the battery cell stack 54 and/or 56 may be electrically coupled in a series arrangement (e.g., a positive terminal 62 of a first battery cell 52 is coupled to a negative terminal 62 of an adjacent battery cell 52) using a plurality of bus bars 140. In other embodiments, the battery cells 52 of the battery cell stack 54 and/or 56 may be coupled in a parallel arrangement (e.g., a positive terminal 62 of a first battery cell 52 is coupled to a positive terminal 62 of an adjacent battery cell 52). As discussed above, the bus bars 140 may position the battery cells 52 a predetermined distance from another, thereby forming a gap 142 between the battery cells 52. In certain embodiments, the total thickness 130 of the double-sided adhesive sheets 50 may be substantially equal to the predetermined distance between the battery cells 52 (e.g., the width/length of the gap 142), such that a size of the battery cell stacks 54, 56 and/or the battery module 20 does not increase when the double-sided adhesive sheets 50 are utilized.

One or more of the disclosed embodiments, alone or in combination, may provide one or more technical effects useful in the manufacture of battery modules, and portions of battery modules. In general, embodiments of the present disclosure include a double-sided adhesive sheet that may adhesively couple battery cells to one another and enable terminal ends of the battery cells to be substantially aligned within a single plane. Additionally, the double-sided adhesive sheet may thermally insulate the battery cells from one another as well as direct thermal energy toward a thermal epoxy layer and/or another component configured to disperse or exhaust the thermal energy outside of the battery module housing. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a stack of battery cells disposed in a battery module housing, wherein each battery cell of the stack of battery cells comprises a terminal end having at least one cell terminal and a face oriented transverse to the terminal end;
an adhesive tape disposed between a first face of a first battery cell of the stack of battery cells and a second face of a second battery cell of the stack of battery cells, wherein the adhesive tape comprises a first thermally conductive layer, a second thermally conductive layer, and a thermally insulative layer positioned between the first thermally conductive layer and the second thermally conductive layer, wherein the adhesive tape fixedly couples the first battery cell to the second battery cell, wherein a first terminal end of the first battery cell is aligned with a second terminal end of the second battery cell, and wherein each battery cell of the stack of battery cells comprises a base end opposite the terminal end; and
a thermal epoxy layer extending along a base surface of the housing, wherein the thermal epoxy layer is positioned between the base ends of each battery cell of the stack of battery cells and the base surface of the housing, wherein the thermally insulative layer of the adhesive tape is configured to substantially block heat transfer between the first battery cell and the second battery cell, wherein the first thermally conductive layer and the second thermally conductive layer are configured to direct thermal energy from the first battery cell and the second battery cell, respectively, toward the thermal epoxy layer, and wherein the thermal epoxy layer is configured to compensate for differences in respective heights between the battery cells of the stack of battery cells.

2. The battery module of claim 1, wherein a first height of the first battery cell is greater than a second height of the second battery cell such that a gap is present between a base end of the second battery cell and the base surface of the housing, and wherein the thermal epoxy layer fills the gap.

3. The battery module of claim 1, wherein the thermally insulative layer comprises polyvinyl chloride (PVC), polyethylene terephthalate (PET), or a combination thereof.

4. The battery module of claim 1, wherein one or both of the first thermally conductive layer or the second thermally conductive layer comprise an adhesive material having thermally conductive properties.

5. The battery module of claim 4, wherein the adhesive material is an acrylic adhesive, or a rubber adhesive, or any combination thereof.

6. The battery module of claim 1, wherein the first thermally conductive layer is configured to anisotropically direct thermal energy from the first battery cell toward the thermal epoxy layer and the second thermally conductive layer is configured to anisotropically direct thermal energy from the second battery cell toward the thermal epoxy layer.

7. The battery module of claim 1, comprising a bus bar electrically coupling the first battery cell and the second battery cell, and wherein the adhesive tape comprises a thickness substantially equal to a gap formed between the first and second battery cells when the first battery cell is coupled to the bus bar and the second battery cell is coupled to the bus bar.

8. The battery module of claim 7, wherein the thickness of the adhesive tape is between 1% and 10% of a thickness of each battery cell of the stack of battery cells.

9. The battery module of claim 1, wherein the adhesive tape comprises an adhesion force of at least 0.05 Newtons per square millimeter ($N/mm^2$).

10. The battery module of claim 1, wherein an additional adhesive tape is disposed between a third face of the second battery cell and a fourth face of a third battery cell of the stack of battery cells, and wherein the additional adhesive tape fixedly couples the second battery cell to the third battery cell, and wherein the second terminal end of the second battery cell is substantially aligned with a third terminal end of the third battery cell.

11. The battery module of claim 1, wherein the adhesive tape comprises a first area substantially equal to a second area of the first and second faces.

12. A battery module, comprising:
a housing comprising a base surface;
a stack of battery cells disposed in the housing, wherein each battery cell of the stack of battery cells comprises a terminal end, a base end opposite the terminal end, and a face, and wherein the terminal end of each battery cell of the stack of battery cells is substantially aligned by a process comprising:
 depositing a layer of thermal epoxy on the base surface of the housing;
 aligning a first terminal end of a first battery cell of the stack of battery cells and a second terminal end of a second battery cell of the stack of battery cells within substantially the same plane;
 disposing adhesive tape between the first battery cell and the second battery cell such that the first battery cell and the second battery cell are fixedly coupled to one another, wherein the adhesive tape comprises a first thermally conductive layer, a second thermally conductive layer, and a thermally insulative layer positioned between the first thermally conductive layer and the second thermally conductive layer, wherein the thermally insulative layer of the adhesive tape is configured to substantially block heat transfer between the first battery cell and the second battery cell, and wherein the first thermally conductive layer and the second thermally conductive layer are configured to direct thermal energy from the first battery cell and the second battery cell, respectively, toward the layer of thermal epoxy; and
 disposing the first battery cell and the second battery cell into the housing such that the layer of thermal epoxy is positioned between the base ends of the first battery cell and the second battery cell and the base surface of the housing, such that the layer of thermal epoxy is configured to compensate for differences in respective heights between the first battery cell and the second battery cell.

13. The battery module of claim 12, wherein a first height of the first battery cell is greater than a second height of the second battery cell such that a gap is present between a base end of the second battery cell and the base surface of the housing, and wherein the layer of thermal epoxy is expanded into to fill the gap.

14. The battery module of claim 12, wherein one or both of the first thermally conductive layer and the second thermally conductive layer comprise an adhesive material having thermally conductive properties.

15. A method of manufacturing a battery module, comprising:
arranging a first battery cell and a second battery cell in a co-planar arrangement by aligning a first terminal end of the first battery cell with a second terminal end of the second battery cell, wherein the first battery cell comprises a first base end opposite the first terminal end and the second battery cell comprises a second base end opposite the second terminal end;
disposing a double-sided adhesive sheet between a first battery cell and a second battery cell such that the first battery cell and the second battery cell are fixedly coupled to one another, wherein the double-sided adhesive sheet comprises a first thermally conductive layer, a second thermally conductive layer, and a thermally insulative layer positioned between the first thermally conductive layer and the second thermally conductive layer;
disposing a thermal epoxy layer between the first base end of the first battery cell and the second base end of the second battery cell and a base surface of a battery module housing, wherein the thermal epoxy layer is configured to compensate for differences in respective heights between the first battery cell and the second battery cell, and wherein the thermally insulative layer of the double-sided adhesive sheet is configured to substantially block heat transfer between the first battery cell and the second battery cell, and wherein the first thermally conductive layer and the second thermally conductive layer are configured to direct thermal energy from the first battery cell and the second battery cell, respectively, toward the thermal epoxy layer; and
positioning the first battery cell and the second battery cell together as a single unit in the battery module housing.

16. The method of claim 15, wherein a base of the battery module housing comprises a heat sink forming a part of the battery module housing.

17. The battery module of claim 1, wherein the first thermally conductive layer and the second thermally conductive layer comprise one or more conductive fillers disposed in alignment with one another along a plane of the adhesive tape to anisotropically direct thermal energy from the first battery cell and the second battery cell, respectively, toward the thermal epoxy layer.

18. The battery module of claim 1, wherein the one or more conductive fillers are spaced apart from one another in a thickness direction of the adhesive tape to substantially block heat transfer between the first battery cell and the second battery cell.

\* \* \* \* \*